Dec. 10, 1957  P. T. SCHARF ET AL  2,815,695
NEUTRAL BEAM SPLITTER
Filed Oct. 22, 1954
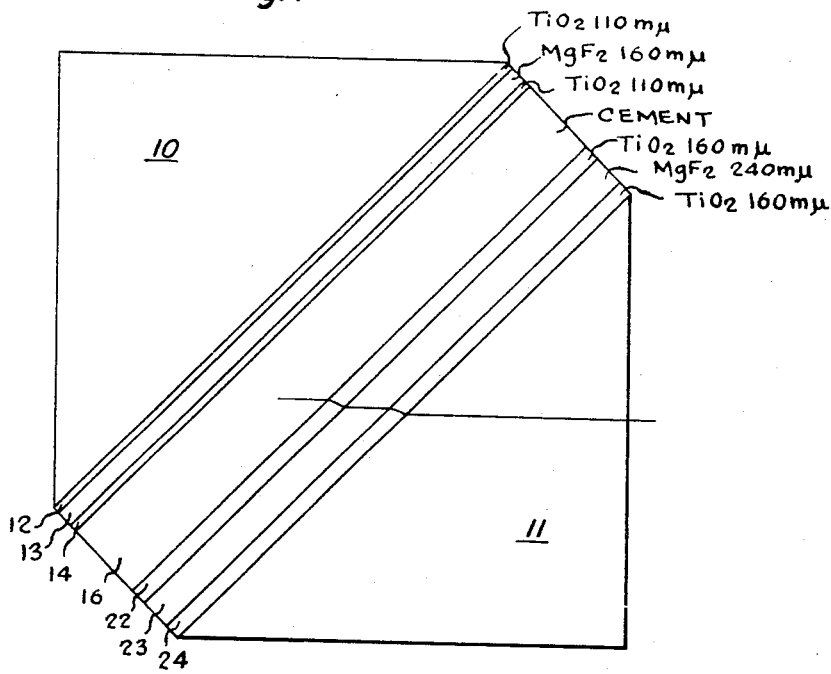
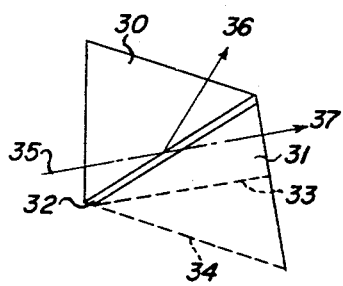
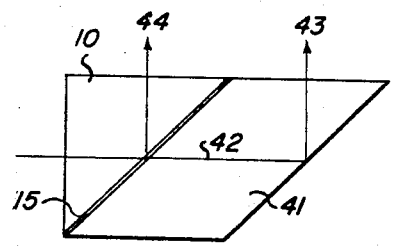
PHILIP T. SCHARF
WILLIAM J. KEENAN
ROBERT J. FAY
INVENTORS
ATTORNEYS

United States Patent Office 2,815,695
Patented Dec. 10, 1957

2,815,695

NEUTRAL BEAM SPLITTER

Philip T. Scharf, William J. Keenan, and Robert J. Fay, Rochester, N. Y., assignors to Eastman Kodak Company, Rochester, N. Y., a corporation of New Jersey Application October 22, 1954, Serial No. 464,096

2 Claims. (Cl. 88—1)

This invention relates to optical beam splitters which reflect and transmit portions of an incident light beam. It relates particularly to neutral beam splitters as distinguished from dichroic beam splitters. It is an object of the invention to produce a highly efficient neutral beam splitter in which the overall loss of light is less than 10% and in which both the reflected and transmitted beams are approximately neutral in color and approximately equal in intensity.

It is known to produce both neutral and dichroic beam splitters by coating optical interference layers on prisms and by cementing the two prisms together, with the layer of cement being relatively thick so as not to contribute to the optical interference effect. The cement layer, for example, should be greater than 10 wavelengths of light thick. The maximum thickness is not critical but in general is less than 100 or 200 wavelengths of light thick. The present invention employs a novel arrangement of the layers in the optical interference coatings, with the low index layers thicker than the high index layers, and thereby practically eliminates all traces of color and at the same time gives practically optimum optical efficiency.

According to the present invention a neutral beam splitter is made up of two right angle isosceles prisms or approximately right angle isosceles prisms with their hypotenuse surfaces supporting optical interference coatings and with these coated surfaces cemented together. The coating on one of the prisms consists of three layers, the middle one being of low index of refraction less than 1.45 with an optical thickness approximately one-quarter wavelength at 650 m$\mu$, measured at approximately normal incidence. The light actually strikes this middle layer at an angle of incidence of about 25° and the alternate layers at 45° so that the effective thickness as far as interference is concerned is less than the normal thickness. However, the thickness is measured at approximately normal incidence and is optically about 160 m$\mu$ (millimicrons) which is a one-quarter wavelength layer for 650 m$\mu$. The other two layers of this particular coating have a high index of refraction greater than 2.0 and each has an optical thickness of about 110 m$\mu$; i. e., a one-quarter wavelength thickness at 450 m$\mu$.

The coating on the other prism is complementary in color and also consists of three layers, the middle one being of low index and thicker than the other two which are of high index. In this case the middle layer has an optical thickness about 240 m$\mu$; i. e., a one-quarter wavelength layer at 950 m$\mu$ and the two high index layers each have a thickness about 160 m$\mu$. The coatings are separated by a relatively thick layer of optical cement.

The accompanying drawing shows preferred embodiments of the invention in which:

Fig. 1 is a schematic showing of a neutral beam splitter according to the invention with the thickness of the optical interference layers greatly exaggerated for clarity; and Figs. 2 and 3 show alternative embodiments of the invention.

In Fig. 1 two right angle isosceles glass prisms 10 and 11 are cemented together with their hypotenuse surfaces facing each other. The prism 10 carries an optical interference coating made up of layers 12, 13 and 14. The layers 12 and 14 consist of titanium dioxide which has an index of refraction between 2.0 and 3.0 coated to an optical thickness of about 110 m$\mu$. The layer 13 consists of magnesium fluoride which has an index of refraction between 1.35 and 1.45 coated to an optical thickness of about 160 m$\mu$.

The prism 11 also carries a triple layer interference coating made up of layers 22, 23 and 24. The layers 22 and 24 consist of titanium dioxide coated to an optical thickness of about 160 m$\mu$. The layer 23 consists of magnesium fluoride coated to an optical thickness of about 240 m$\mu$. All of these optical interference layers are applied to their respective prisms by well-known vacuum coating techniques. The layers 14 and 22 are then cemented together by a layer of optical cement 16. The thickness of this layer is not critical, but in order not to interfere with the optical interference effects, it is preferably greater than 10 wavelengths of light thick and preferably less than 200 wavelengths of light thick.

In Fig. 2 the invention is applied to prisms 30 and 31 with the beam splitting layers indicated at 32 consisting of the same seven layers as shown in Fig. 1. The prism 30 is not a right angle prism and illustrates the fact that the present invention does not depend on the prism being absolutely a right angle prism. It works even with prisms which are only approximately right angle prisms. This prism 30 is preferably isosceles, however, so that both the incident ray 35 and the emergent reflected ray 36 strike the entrance and exit faces of the prism normal. The prism 31 preferably has its exit face parallel to the entrance face of prism 30 so that the transmitted ray 37 emerges parallel to the incident ray 35. The other surface of this prism 31 has no effect on the light and can be located anywhere within reason such as at 33 or 34. The prism 37 thus need not be either right angle or isosceles. It is customary to make this lower surface of prism 34 parallel to the upper surface of prism 30 either merely for convenience in manufacture or so that the unit can be used simultaneously as a beam splitter (and/or combiner) in two directions at once.

The prism 30 should be approximately a right angle one so that the ray 35 is incident on the interlayers 32 at approximately 45°. The layer thicknesses as specified give the most nearly perfectly neutral color at this angle of incidence, but there is a fairly large tolerance range in which the degree of neutrality is acceptable.

Fig. 3 shows an arrangement similar to Fig. 1 in which the prism 11 is replaced by a rhomboid prism 41 which reflects the beam 42 transmitted by the beam splitting layer 15 so that it emerges at 43 parallel to the reflected beam 44. The beam splitting layer 15 is made up of seven layers as shown in Fig. 1.

We claim:

1. A neutral beam splitter comprising two approximately right angle isosceles glass prisms with their hypotenuse surfaces supporting optical interference coatings and cemented together, the coating on one of the prisms consisting of three layers, the middle one being low index, less than 1.45 with an optical thickness about 160 m$\mu$ and the other two layers being high index greater than 2.0, each with an optical thickness about 110 m$\mu$, the coating on the other prism also consisting of three layers, the middle one being low index, between 1.35 and 1.45 with an optical thickness about 240 m$\mu$ and the other two layers being high index between 2.0 and 3.0 each with an optical thickness about 160 m$\mu$ and the two triple layer coatings being separated by a layer of optical cement between 10 and 200 wavelengths of light thick, the glass and the cement having indices of refraction substantially less than that of the high index layers.

2. A beam splitter according to claim 1 in which the two low index layers consist of magnesium fluoride and the four high index layers consist of titanium dioxide.

References Cited in the file of this patent

UNITED STATES PATENTS 2,399,860   Dimmick _____ May 7, 1946

OTHER REFERENCES

Banning article in J. O. S. A., vol. 37, October 1947, pages 792–797.